United States Patent
Mizuno et al.

(10) Patent No.: US 7,610,139 B2
(45) Date of Patent: Oct. 27, 2009

(54) IN-CYLINDER PRESSURE DETECTION DEVICE AND METHOD FOR INTERNAL COMBUSTION ENGINE, AND ENGINE CONTROL UNIT

(75) Inventors: Takahide Mizuno, Saitama (JP); Shusuke Akazaki, Saitama (JP); Hiroyuki Sugiura, Saitama (JP); Mitsuo Hashizume, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 11/896,066

(22) Filed: Aug. 29, 2007

(65) Prior Publication Data

US 2008/0059044 A1 Mar. 6, 2008

(30) Foreign Application Priority Data

Aug. 31, 2006 (JP) .............................. 2006-235570

(51) Int. Cl.
*G06F 19/00* (2006.01)
*G01M 15/08* (2006.01)
*F02D 28/00* (2006.01)
*F02D 45/00* (2006.01)

(52) U.S. Cl. ...................... 701/102; 701/110; 701/114; 73/114.16

(58) Field of Classification Search ............ 123/406.41, 123/435, 677; 701/101–105, 110, 111, 114, 701/115; 73/114.16, 114.17, 114.22; 702/138, 702/182, 183

See application file for complete search history.

(56) References Cited

U.S. PATENT DOCUMENTS

| 5,076,098 | A | * | 12/1991 | Miwa | .................. 73/114.17 |
| 5,255,209 | A | | 10/1993 | Krebs | |
| 5,375,462 | A | | 12/1994 | Kuroda et al. | |
| 7,117,082 | B2 | * | 10/2006 | Kohira et al. | ............... 701/114 |
| 7,386,388 | B2 | * | 6/2008 | Akazaki et al. | ............. 701/103 |
| 2003/0131832 | A1 | | 7/2003 | Matsumoto | |
| 2006/0116812 | A1 | | 6/2006 | Akazaki et al. | |

FOREIGN PATENT DOCUMENTS

| JP | 11193743 A | * | 7/1999 | .............. 73/114.16 |
| JP | 2006 138205 | | 6/2006 | |

* cited by examiner

*Primary Examiner*—Willis R Wolfe, Jr.
(74) *Attorney, Agent, or Firm*—Arent Fox LLP

(57) ABSTRACT

An in-cylinder pressure detection device for an internal combustion engine, which is capable of detecting an in-cylinder pressure accurately without being adversely affected by changes in the atmospheric pressure even when the atmospheric pressure changes. An in-cylinder pressure sensor detects pressure within a cylinder as a detected in-cylinder pressure. An ECU estimates pressure generated in the cylinder during a non-combustion period as a motoring pressure. An atmospheric pressure sensor detects an atmospheric pressure (PA). The ECU corrects the motoring pressure according to the atmospheric pressure and identifies correction parameters such that the difference between the detected in-cylinder pressure detected during a compression stroke of the engine and the corrected motoring pressure becomes minimum, and corrects the detected in-cylinder pressure by the identified correction parameters, to thereby calculate an in-cylinder pressure.

12 Claims, 6 Drawing Sheets

IN-CYLINDER PRESSURE DETECTION DEVICE AND METHOD FOR INTERNAL COMBUSTION ENGINE, AND ENGINE CONTROL UNIT

BACKGROUND OF THE INVENTION

1. Field of the Invention

This invention relates to an in-cylinder pressure detection device and method for an internal combustion engine, for detecting pressure within a cylinder of the engine, and an engine control unit.

2. Description of the Related Art

Conventionally, there has been disclosed an in-cylinder pressure detection device e.g. in Japanese Laid-Open Patent Publication (Kokai) No. 2006-138205. In the in-cylinder pressure detection device, pressure within a cylinder is detected as a detected in-cylinder pressure by an in-cylinder pressure sensor. Further, by taking into considering, for example, that the output characteristics of the in-cylinder pressure sensor drift according to temperature, to compensate for the drift of the output characteristics of the sensor, the detected in-cylinder pressure is corrected using a motoring pressure. The motoring pressure, which represents pressure generated in the cylinder during a non-combustion period, is calculated by calculating a basic value thereof by the gas state equation according to the amount of intake air drawn into the cylinder, an intake air temperature, and the volume of the cylinder (combustion chamber) dependent on a crank angle, and correcting the basic value by correction parameters. The correction parameters are respectively formed by a correction coefficient by which is multiplied the basic value, and a correction term added to the resulting basic value. The correction coefficient and the correction term are both set based on the rotational speed of the engine and the intake air amount.

Then, the correction parameters for correcting the in-cylinder pressure are identified e.g. by a least-squares method, using the detected in-cylinder pressure and the motoring pressure obtained during a compression stroke such that the difference between the detected in-cylinder pressure and the motoring pressure becomes minimum. The correction parameters are also respectively formed by a correction coefficient and a correction term, and the detected in-cylinder pressure is corrected by multiplying the detected in-cylinder pressure by the correction coefficient, and further adding the correction term to the resulting detected in-cylinder pressure, whereby a final in-cylinder pressure is calculated. Further, in the in-cylinder pressure detection device, it is determined that there has occurred a misfire, when the ratio between the motoring pressure calculated during a combustion stroke and the detected in-cylinder pressure detected during the same combustion stroke and corrected as described above is smaller than a predetermined threshold value.

As described above, in the conventional in-cylinder pressure detection device, the motoring pressure is calculated by applying the correction parameters set based on the rotational speed of the engine and the intake air amount to the basic value calculated using the gas state equation, as described above. Therefore, for example, when the atmospheric pressure changes, an actual in-cylinder pressure changes according to the change in the atmospheric pressure, whereas the change in the atmospheric pressure is not reflected on the motoring pressure, which makes it impossible to properly calculate the motoring pressure. As a result, the correction parameters for correcting the in-cylinder pressure, which is identified based on the motoring pressure and the in-cylinder pressure deviate from proper values, and the final in-cylinder pressure corrected using the correction parameters also deviates from a true value, which degrades detection accuracy. Further, when determinations or detections are performed based on the relationship between the corrected in-cylinder pressure and the motoring pressure, e.g. as when a misfire is determined by the conventional in-cylinder pressure detection device, or when similar determinations or the like are performed based on the identified correction parameters, the determination or detection accuracy is also degraded.

SUMMARY OF THE INVENTION

It is an object of the invention to provide an in-cylinder pressure detection device and method for an internal combustion engine and an engine control unit, which are capable of detecting an in-cylinder pressure accurately without being adversely affected by changes in the atmospheric pressure even when the atmospheric pressure changes.

To attain the above object, in a first aspect of the present invention, there is provided an in-cylinder pressure detection device for an internal combustion engine, comprising an in-cylinder pressure sensor for detecting pressure within a cylinder of the engine as a detected in-cylinder pressure, motoring pressure-estimating means for estimating pressure generated in the cylinder during a non-combustion period as a motoring pressure, atmospheric pressure-detecting means for detecting an atmospheric pressure, motoring pressure-correcting means for correcting the estimated motoring pressure according to the detected atmospheric pressure, correction parameter-identifying means for identifying correction parameters such that a difference between the detected in-cylinder pressure detected during a compression stroke of the engine and the corrected motoring pressure becomes minimum, and in-cylinder pressure-correcting means for correcting the detected in-cylinder pressure by the identified correction parameters, to thereby calculate an in-cylinder pressure.

This in-cylinder pressure detection device detects the pressure within the cylinder as the detected in-cylinder pressure by the in-cylinder pressure sensor, and estimates pressure generated in the cylinder during the non-combustion period as the motoring pressure. The estimated motoring pressure is corrected according to the detected atmospheric pressure. Further, the correction parameters are identified such that the difference between the detected in-cylinder pressure detected during the compression stroke of the engine and the corrected motoring pressure becomes minimum. The detected in-cylinder pressure is corrected by the identified correction parameters, whereby the in-cylinder pressure is finally calculated.

As described above, according to the first aspect of the present invention, the motoring pressure is corrected based on the detected actual atmospheric pressure, and therefore it is possible to estimate the motoring pressure properly while causing changes in the atmospheric pressure to be reflected on the motoring pressure. This makes it possible to properly identify the correction parameters based on the motoring pressure and the detected in-cylinder pressure, and correct the detected in-cylinder pressure by the identified correction parameters, whereby the in-cylinder pressure can be accurately calculated (detected) without being adversely affected by changes in the atmospheric pressure.

Preferably, the in-cylinder pressure detection device further comprises crank angle-detecting means for detecting a crank angle of the engine, and the motoring pressure-estimating means calculates the motoring pressure by an arithmetic expression including a volume of the cylinder which is calculated based on the detected crank angle.

Preferably, the motoring pressure-correcting means corrects the motoring pressure such that as the atmospheric pressure is lower, the motoring pressure becomes lower.

Preferably, the in-cylinder pressure detection device further comprises determination means for performing predetermined determination including determination of abnormality of the in-cylinder pressure sensor based on the correction parameters.

As described above, since the correction parameters are identified such that the difference between the detected in-cylinder pressure and the motoring pressure becomes minimum, they represent the degree of agreement between the motoring pressure and the detected in-cylinder pressure. This makes it possible to determine abnormality of the in-cylinder pressure sensor based on the correction parameters, for example. Further, as described above, since the correction parameters are properly identified based on the atmospheric pressure, it is possible to perform determination based on the correction parameters more accurately while eliminating adverse influence of the atmospheric pressure.

To attain the above object, in a second aspect of the present invention, there is provided a method of detecting in-cylinder pressure of an internal combustion engine, comprising an in-cylinder pressure-detecting step of detecting pressure within a cylinder of the engine as a detected in-cylinder pressure, a motoring pressure-estimating step of estimating pressure generated in the cylinder during a non-combustion period as a motoring pressure, an atmospheric pressure-detecting step of detecting an atmospheric pressure, a motoring pressure-correcting step of correcting the estimated motoring pressure according to the detected atmospheric pressure, a correction parameter-identifying step of identifying correction parameters such that a difference between the detected in-cylinder pressure detected during a compression stroke of the engine and the corrected motoring pressure becomes minimum, and an in-cylinder pressure-correcting step of correcting the detected in-cylinder pressure by the identified correction parameters, to thereby calculate an in-cylinder pressure.

With the configuration of the second aspect of the present invention, it is possible to obtain the same advantageous effects as provided by the first aspect of the present invention.

Preferably, the method further comprises a crank angle-detecting step of detecting a crank angle of the engine, and the motoring pressure-estimating step includes calculating the motoring pressure by an arithmetic expression including a volume of the cylinder which is calculated based on the detected crank angle.

Preferably, the motoring pressure-correcting step includes correcting the motoring pressure such that as the atmospheric pressure is lower, the motoring pressure becomes lower.

Preferably, the method further comprises a determination step of performing predetermined determination including determination of abnormality of an in-cylinder pressure sensor that detects the in-cylinder pressure, based on the correction parameters.

With the configuration of this preferred embodiment, it is possible to obtain the same advantageous effects as provided by the preferred embodiment of the first aspect of the present invention.

To attain the object, in a third aspect of the present invention, there is provided an engine control unit including a control program for causing a computer to execute a method of detecting in-cylinder pressure of an internal combustion engine, wherein the control program causes the computer to detect pressure within a cylinder of the engine as a detected in-cylinder pressure, estimate pressure generated in the cylinder during a non-combustion period as a motoring pressure, detect an atmospheric pressure, correct the estimated motoring pressure according to the detected atmospheric pressure, identify correction parameters such that a difference between the detected in-cylinder pressure detected during a compression stroke of the engine and the corrected motoring pressure becomes minimum, and correct the detected in-cylinder pressure by the identified correction parameters, to thereby calculate an in-cylinder pressure.

With the configuration of the third aspect of the present invention, it is possible to obtain the same advantageous effects as provided by the first aspect of the present invention.

Preferably, the control program further causes the computer to detect a crank angle of the engine, and when the control program causes the computer to estimate the motoring pressure, the control program causes the computer to calculate the motoring pressure by an arithmetic expression including a volume of the cylinder which is calculated based on the detected crank angle.

Preferably, the control program causes the computer to correct the motoring pressure, the control program causes the computer to correct the motoring pressure such that as the atmospheric pressure is lower, the motoring pressure becomes lower.

Preferably, the control program further causes the computer to perform predetermined determination including determination of abnormality of an in-cylinder pressure sensor that detects the in-cylinder pressure, based on the correction parameters.

With the configuration of this preferred embodiment, it is possible to obtain the same advantageous effects as provided by the preferred embodiment of the first aspect of the present invention.

The above and other objects, features, and advantages of the invention will become more apparent from the following detailed description taken in conjunction with the accompanying drawings.

DETAILED DESCRIPTION OF PREFERRED EMBODIMENTS

Figure 1:
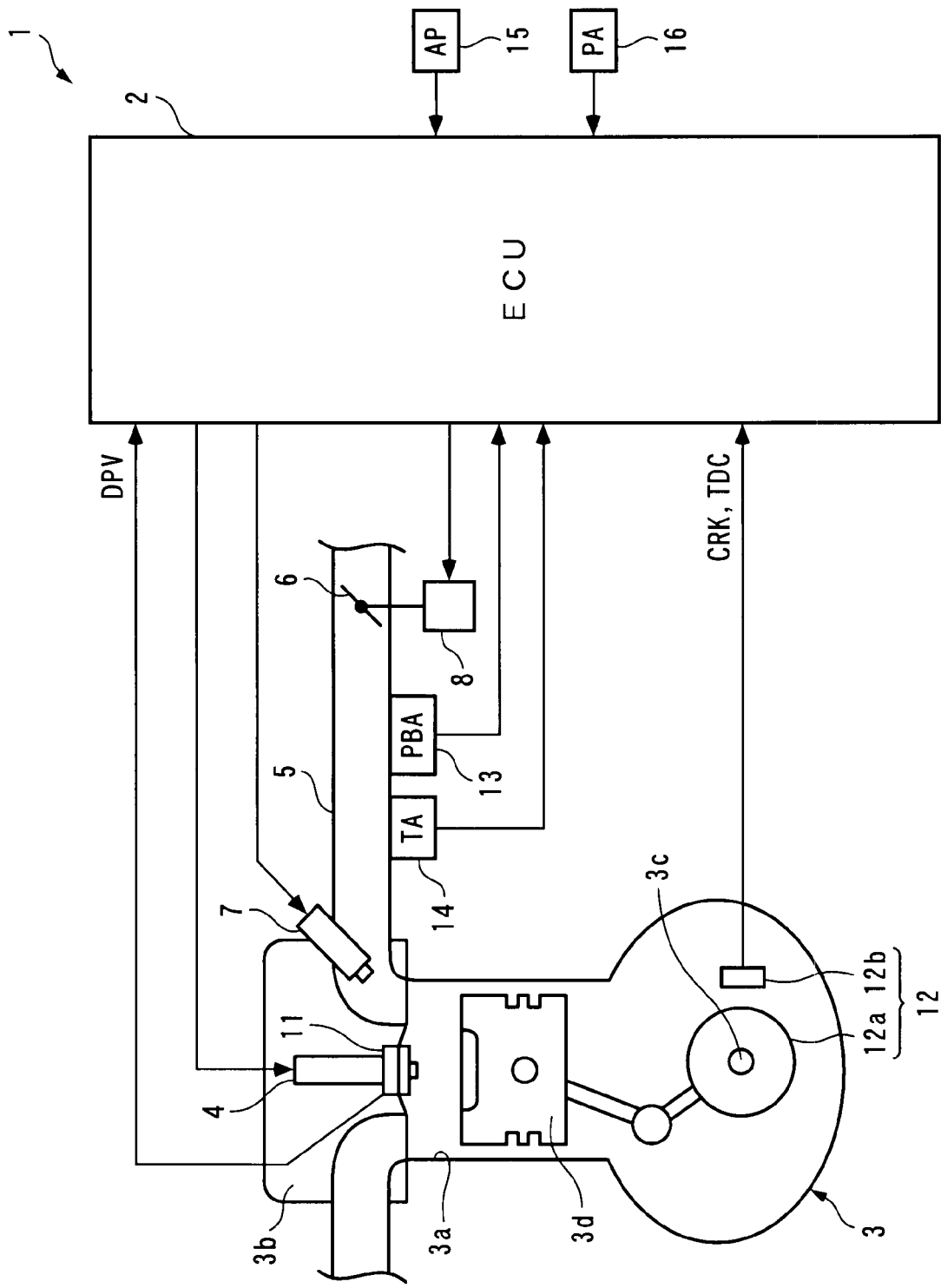
FIG. 1 is a schematic diagram of an in-cylinder pressure detection device according to an embodiment of the present invention, together with an internal combustion engine.

The present invention will now be described in detail with reference to the drawings showing a preferred embodiment thereof. FIG. 1 schematically shows an in-cylinder pressure detection device 1 according to the present embodiment, together with an internal combustion engine (hereinafter simply referred to as "the engine") 3. The engine 3 is e.g. a four-cycle gasoline engine installed on a vehicle, not shown.

A cylinder 3a of the engine 3 has a spark plug 4 inserted therein. The ignition timing of the spark plug 4 is controlled by a drive signal from an ECU 2, described hereinafter.

The spark plug 4 has an in-cylinder pressure sensor 11 integrally mounted thereon. The in-cylinder pressure sensor 11, which is formed by an annular piezoelectric element, is screwed into a cylinder head 3b together with the spark plug 4, whereby it is mounted on the cylinder head 3 in a state held between the spark plug 4 and the cylinder head 3b. The in-cylinder pressure sensor 11 delivers to the ECU 2 a detection signal indicative of a sensed amount DPV of change in the pressure within the cylinder 3a. The ECU 2 calculates the pressure PCYLF within the cylinder 3a (hereinafter referred to as "the in-cylinder pressure PCYLF") based on the amount DPV of change in the pressure.

The engine 3 is provided with a crank angle sensor 12. The crank angle sensor 12 is comprised of a magnet rotor 12a fitted on a crankshaft 3c, and an MRE pickup 12b, and delivers a CRK signal and a TDC signal, which are pulse signals, to the ECU 2 in accordance with rotation of the crankshaft 3c.

Each pulse of the CRK signal is generated whenever the crankshaft 3c rotates through a predetermined crank angle (e.g. 1°). The ECU 2 calculates rotational speed NE of the engine 3 (hereinafter referred to as "the engine speed NE") based on the CRK signal. Further, the TDC signal indicates that a piston 3d in the associated cylinder 3a is in a predetermined crank angle position slightly before the TDC position at the start of the intake stroke, and each pulse of the TDC signal is generated whenever the crankshaft 3c rotates through a predetermined crank angle. The ECU 2 calculates a crank angle CA with reference to a crank angle (0°) at which the TDC signal pulse is generated, based on the TDC signal and the CRK signal.

An intake pipe 5 of the engine 3 has a throttle valve 6, an intake pipe pressure sensor 13, and an intake air temperature sensor 14 arranged therein in the mentioned order from the upstream side. The degree of opening of the throttle valve 6 is controlled by the ECU 2 driving an actuator 8 connected to the throttle valve 6, whereby the amount of intake air (intake air amount) is controlled. The intake pipe pressure sensor 13 detects pressure PBA within the intake pipe 5 (hereinafter referred to as "the intake pipe pressure PBA") as an absolute pressure, to deliver a detection signal indicative of the sensed intake pipe pressure PBA to the ECU 2, while the intake air temperature sensor 14 detects temperature within the intake pipe 5 (hereinafter referred to as "the intake air temperature") to deliver a detection signal indicative of the sensed intake air temperature to the ECU 2.

An injector 7 for supplying fuel to the cylinder 3a is inserted into the intake pipe 5 at a location downstream of the throttle valve 6 in a manner facing an intake port, not shown. A fuel injection amount TOUT of fuel to be injected by the injector 7 is controlled by the ECU 2.

Further, a detection signal indicative of a sensed stepped-on amount AP of an accelerator pedal, not shown, of the vehicle (hereinafter referred to as "the accelerator opening degree AP") is delivered to the ECU 2 from an accelerator opening sensor 15, and a detection signal indicative of a sensed atmospheric pressure PA is delivered to the ECU 2 from an atmospheric pressure sensor 16.

The ECU 2 is implemented by a microcomputer comprised of an I/O interface, a CPU, a RAM, a ROM, and so forth. The ECU 2 determines operating conditions of the engine 3, based on the detection signals delivered from the above-mentioned sensors 11 to 16, and carries out engine control processes including a fuel injection control process and an ignition timing control process, based on the determined operating conditions. For example, during decelerating operation of the engine 3, when the accelerator opening degree AP is equal to a predetermined opening degree (e.g. 0°), and when the engine speed NE is higher than a predetermined rotational speed (e.g. 1000 rpm), the ECU 2 controls the fuel injection amount TOUT to a value of 0, whereby fuel cut-off operation (hereinafter referred to as "F/C operation") for cutting off fuel supply is performed.

Further, the ECU 2 calculates a detected in-cylinder pressure PCYLT based on the output DPV from the in-cylinder pressure sensor 11, and calculates a final in-cylinder pressure PCYLF by correcting the detected in-cylinder pressure PCYLT, as described hereinafter. More specifically, the ECU 2 corresponds to motoring pressure-estimating means, motoring pressure-correcting means, correction parameter-identifying means, in-cylinder pressure-correcting means, and determination means.

Figure 2:
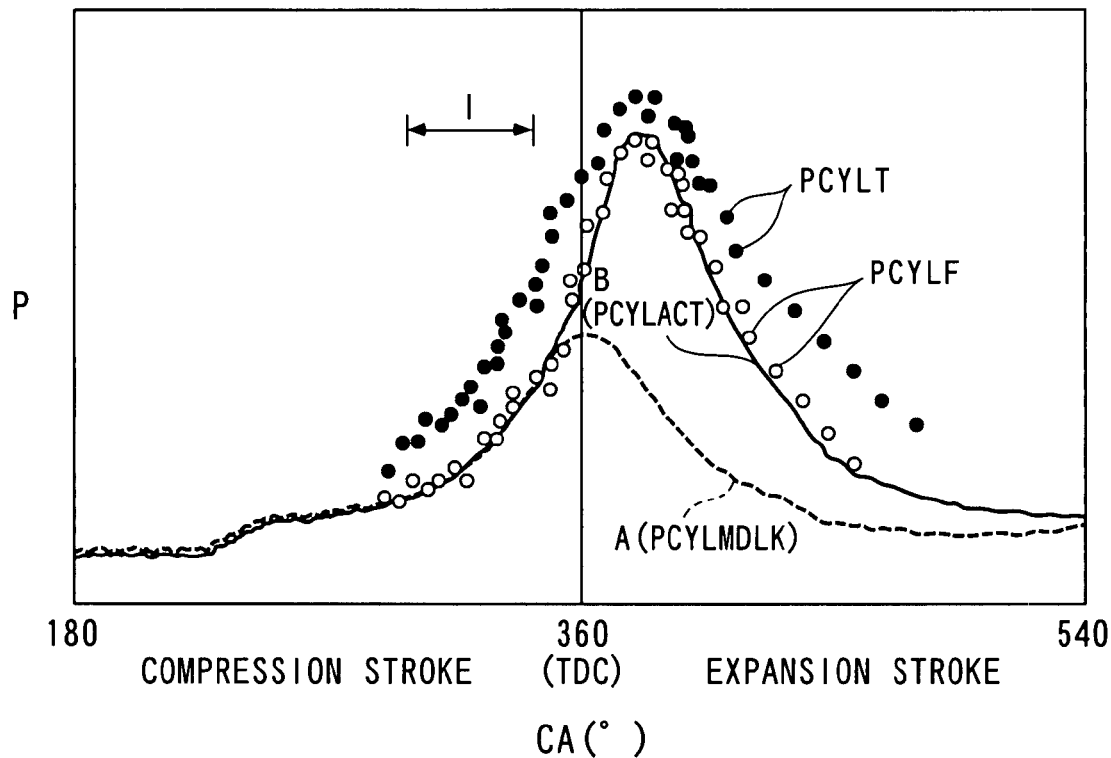
FIG. 2 is a diagram which is useful in explaining an in-cylinder pressure-calculating process according to the present embodiment.

First, the outline of the in-cylinder pressure-calculating process executed by the ECU 2 will be described with reference to FIG. 2. FIG. 2 shows changes in pressure P within the cylinder 3a, in a crank angle section between a crank angle CA of 180° to a crank angle CA of 540°, and a crank angle CA of 360° corresponds to the TDC position at the start of the expansion (combustion) stroke. A curve A appearing in FIG. 2 indicates changes in the motoring pressure PCYLMDLK (in-cylinder pressure during a non-combustion period) in a cylinder 3a, and the motoring pressure PCYLMDLK almost reaches its peak at the TDC position. Further, a curve B indicates changes in an actual in-cylinder pressure (true value) PCYLACT obtained when normal combustion is performed in the same cylinder 3a, and the actual in-cylinder pressure PCYLACT reaches its peak in the vicinity of the ignition timing after the TDC position.

On the other hand, black circles in FIG. 2 indicates the detected in-cylinder pressure PCYLT detected by the in-cylinder pressure sensor 11. It should be noted that the detected in-cylinder pressure PCYLT is calculated by integrating the output DPV from the in-cylinder pressure sensor 11 using a charge-sensitive amplifier, and then eliminating temperature-dependent noise from the integral value. In the illustrated example, the detected in-cylinder pressure PCYLT is larger than the actual in-cylinder pressure PCYLACT. The difference of the detected in-cylinder pressure PCYLT from the actual in-cylinder pressure PCYLACT is caused e.g. by the drift of the output characteristics of the in-cylinder pressure sensor 11 occurring according to temperature. To compensate for the difference, the detected in-cylinder pressure PCYLT is corrected by the following equation (1) to thereby calculate the in-cylinder pressure PCYLF:

$$PCYLF = PCYLT \times K1 + C1 \qquad (1)$$

Further, the above correction parameters K1 and C1 are identified in a predetermined identification section I during a compression stroke, shown in FIG. 2. More specifically, the correction parameters K1 and C1 are calculated by a least-squares method such that the square of the value of the difference (PCYLMDLK−PCYLF) between the motoring pressure PCYLMDLK estimated in the identification section I and the in-cylinder pressure PCYLF calculated by applying the above-described equation (1) to the detected in-cylinder pressure PCYLT that is detected in the same timing as the timing of the estimation of the motoring pressure PCYLMDLK, becomes minimum. Then, the calculated correction parameters K1 and C1 are applied to the equation (1) to correct the detected in-cylinder pressure PCYLT, whereby the in-cylinder pressure PCYLF is calculated. Values of the in-cylinder pressure PCYLF calculated as above are indicated by white circles in FIG. 2. As shown in FIG. 2, the in-cylinder pressure PCYLF is calculated as a value which is approximately equal to PCYLACT and in which the detected in-cylinder pressure PCYLT and the actual in-cylinder pressure PCYLACT is compensated for.

Figure 3:
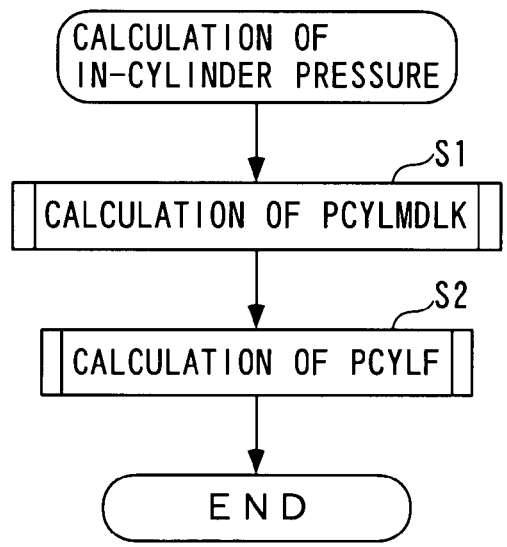
FIG. 3 is a flowchart showing a main flow (main routine) of the in-cylinder pressure-calculating process.

Next, the in-cylinder pressure-calculating process executed by the ECU 2 will be described with reference to FIGS. 3 to 7. FIG. 3 shows a main flow (main routine) of the in-cylinder pressure-calculating process, which is executed in synchronism with generation of each CRK signal pulse. In a step 1 (shown as S1 in abbreviated form in FIG. 3; the following steps are also shown in abbreviated form), a process for calculating the motoring pressure PCYLMDLK is executed as a subroutine described hereinafter with reference to FIG. 4. In the next step 2, a process for identifying the correction parameters K1 and C1 based on the calculated motoring pressure PCYLMDLK and the detected in-cylinder pressure PCYLT, and calculating the in-cylinder pressure PCYLF using the correction parameters K1 and C1, is executed as a subroutine described hereinafter with reference to FIG. 7.

Figure 4:
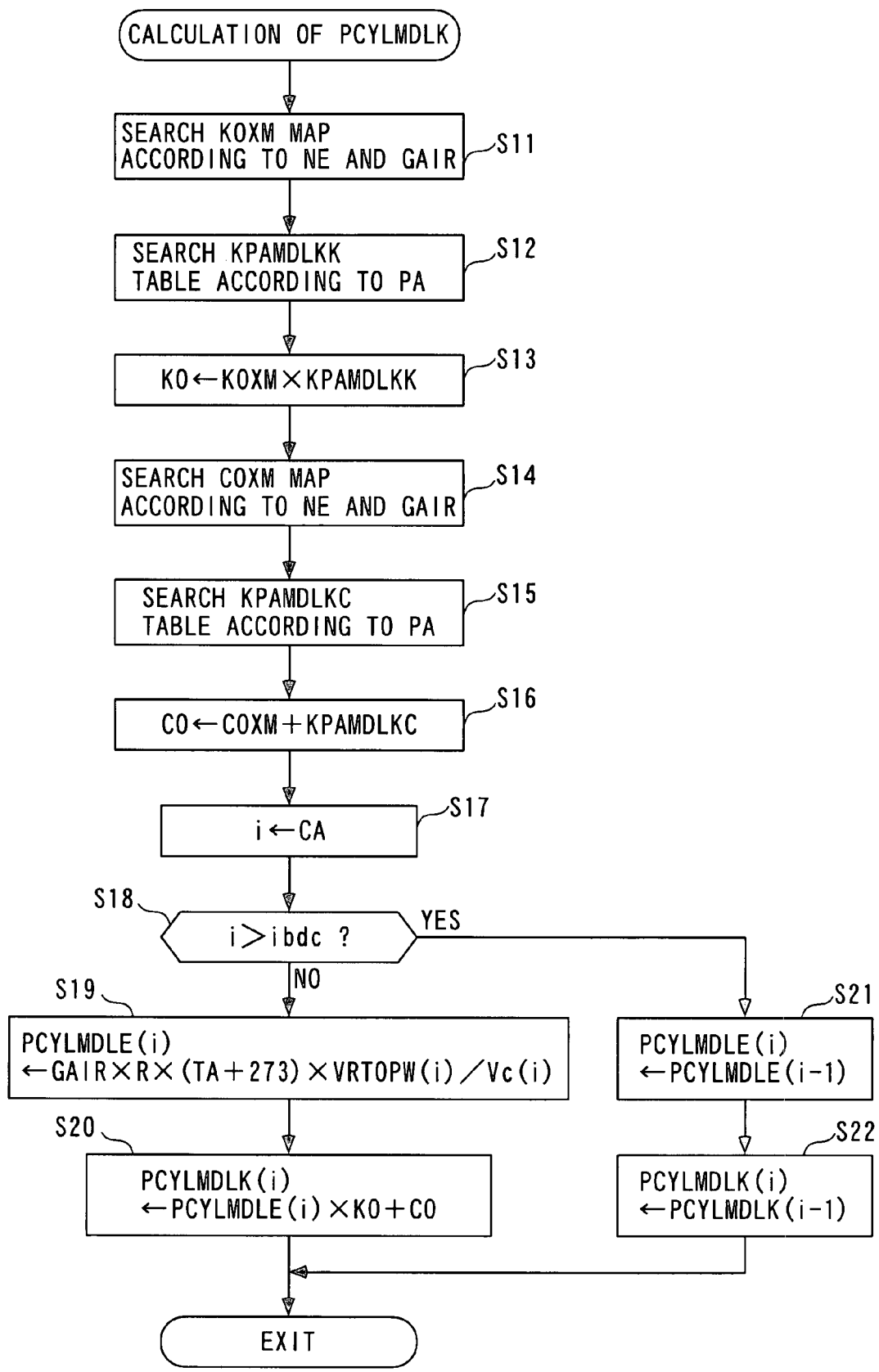
FIG. 4 is a flowchart showing a process (subroutine) for calculating a motoring pressure.

FIG. 4 shows the process for calculating the motoring pressure PCYLMDLK. First, in a step 11, a basic value KOXM of a correction coefficient K0, which is one of correction parameters for correcting the motoring pressure PCYLMDLK, is calculated by searching a KOXM map, not shown, according to the engine speed NE and the intake air amount GAIR. The KOXM map is prepared by determining appropriate values of the correction coefficient K0 each dependent on the NE value and the GAIR value in advance e.g. by experiment, and forming the appropriate values into a map. It should be noted that the intake air amount GAIR is calculated based on the engine speed NE and the intake pipe pressure PBA.

Figure 5:
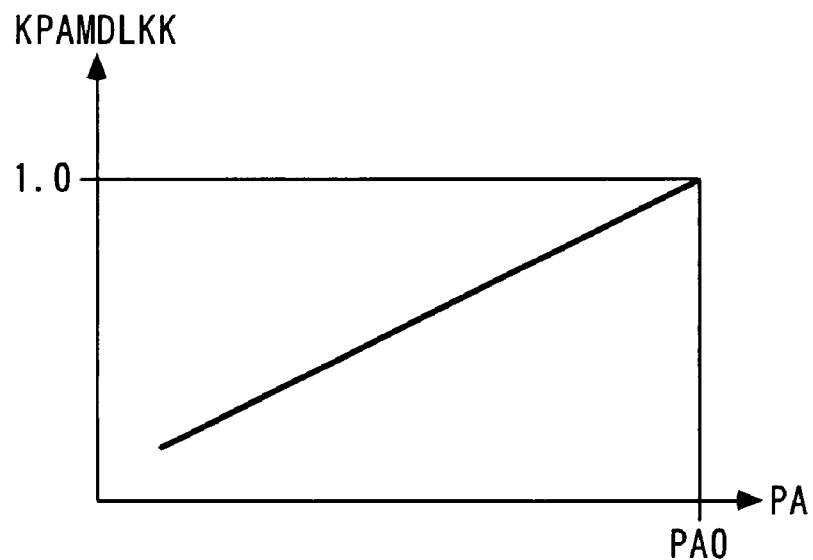
FIG. 5 is a table of an atmospheric pressure-dependent correction coefficient for use in the FIG. 4 process.

Then, an atmospheric pressure-dependent correction coefficient KPAMDLKK is calculated by searching a table in FIG. 5, according to the atmospheric pressure PA (step 12). In this table, the atmospheric pressure-dependent correction coefficient KPAMDLKK is linearly configured such that it is set to a value of 1.0 for a reference atmospheric pressure corresponding to an atmospheric pressure PA0 on a lowland, and becomes smaller as the atmospheric pressure PA is lower. Then, the correction coefficient K0 is calculated by multiplying the basic value KOXM calculated as above by the atmospheric pressure-dependent correction coefficient KPAMDLKK (step 13).

Next, a basic value COXM of a correction term C0, which is the other of the correction parameters for correcting the motoring pressure PCYLMDLK, is calculated by searching a COXM map, not shown, according to the engine speed NE and the intake air amount GAIR (step 14). The COXM map is prepared by determining appropriate values of the correction term C0 each dependent on the NE value and the GAIR value in advance e.g. by experiment, and forming the appropriate values into a map.

Figure 6:
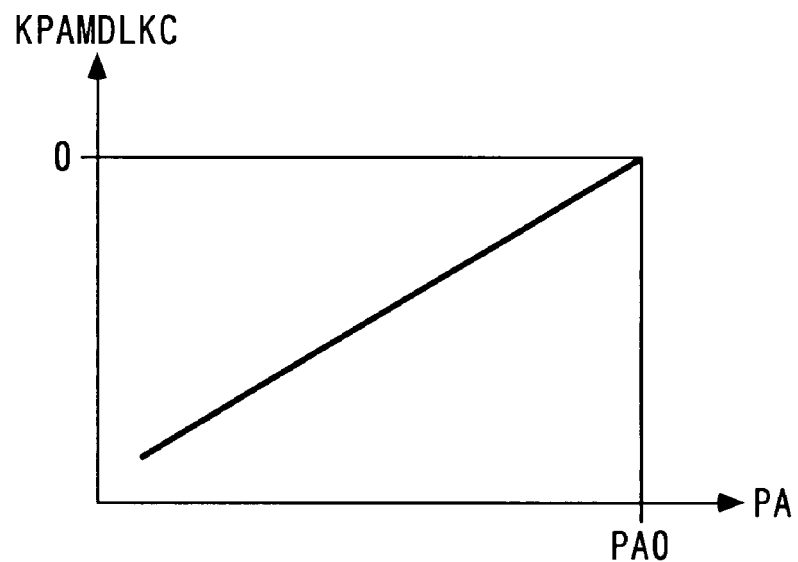
FIG. 6 is a table of an atmospheric pressure-dependent correction term for use in the FIG. 4 process.

Then, an atmospheric pressure-dependent correction term KPAMDLKC is calculated by searching a table in FIG. 6, according to the atmospheric pressure PA (step 15). In this table, the atmospheric pressure-dependent correction term KPAMDLKC is linearly configured such that it is set to a value of 0 for the reference atmospheric pressure PA0, and becomes smaller as the atmospheric pressure PA is lower. Then, the correction term C0 is calculated by adding the atmospheric pressure-dependent correction term KPAMDLKC to the basic value COXM (step 16).

Subsequently, the current crank angle CA is set to a sampling number i (step 17), and it is determined whether or not the sampling number i is larger than a predetermined value ibdc (e.g. 540) corresponding to the BDC position at the end of the expansion stroke (step 18). If the answer to this question is negative (NO), i.e. if the expansion stroke is not terminated yet, a basic value PCYLMDLE of the motoring pressure is calculated by the following equation (2) (step 19):

$$PCYLMDLE(i)=GAIR \times R \times (TA+273) \times VRTOPW(i)/Vc(i) \qquad (2)$$

The equation (2) is obtained by applying the gas state equation to the cylinder 3a, and on the right side thereof, GAIR represents the intake air amount, R a gas constant, TA an intake air temperature (° C.) detected by the intake air temperature sensor 14, and VRTOPW(i) an adiabatic compression-dependent correction coefficient. Further, Vc(i) represents the volume of the cylinder 3a, that is, the volume of a space defined by the cylinder head 3b, the cylinder 3a, and the piston 3d, and is calculated based on the volume of the combustion chamber, the cross-sectional area of the piston 3d, the crank angle CA, the length of a connecting rod, and the crank length of the crankshaft 3c.

Then, the motoring pressure PCYLMDLK is calculated using the basic value PCYLMDLE, the correction coefficient K0, and the correction term C0, calculated as above, by the following equation (3) (step 20):

$$PCYLMDLK(i)=PCYLMDLE(i) \times K0+C0 \qquad (3)$$

followed by terminating the present process.

On the other hand, if the answer to the question of the step 18 is affirmative (YES), i.e. if the expansion stroke is terminated, the immediately preceding value PCYLMDLE(i−1) of the basic value is set to a current value PCYLMDLE(i) thereof (step 21), and the immediately preceding value PCYLMDLK(i−1) of the motoring pressure is set to a current value PCYLMDLK(i) thereof (step 22), followed by terminating the present process. As described above, both the basic value PCYLMDLE and the motoring pressure PCYLMDLK are held at respective values at the end of the expansion stroke.

Figure 7:
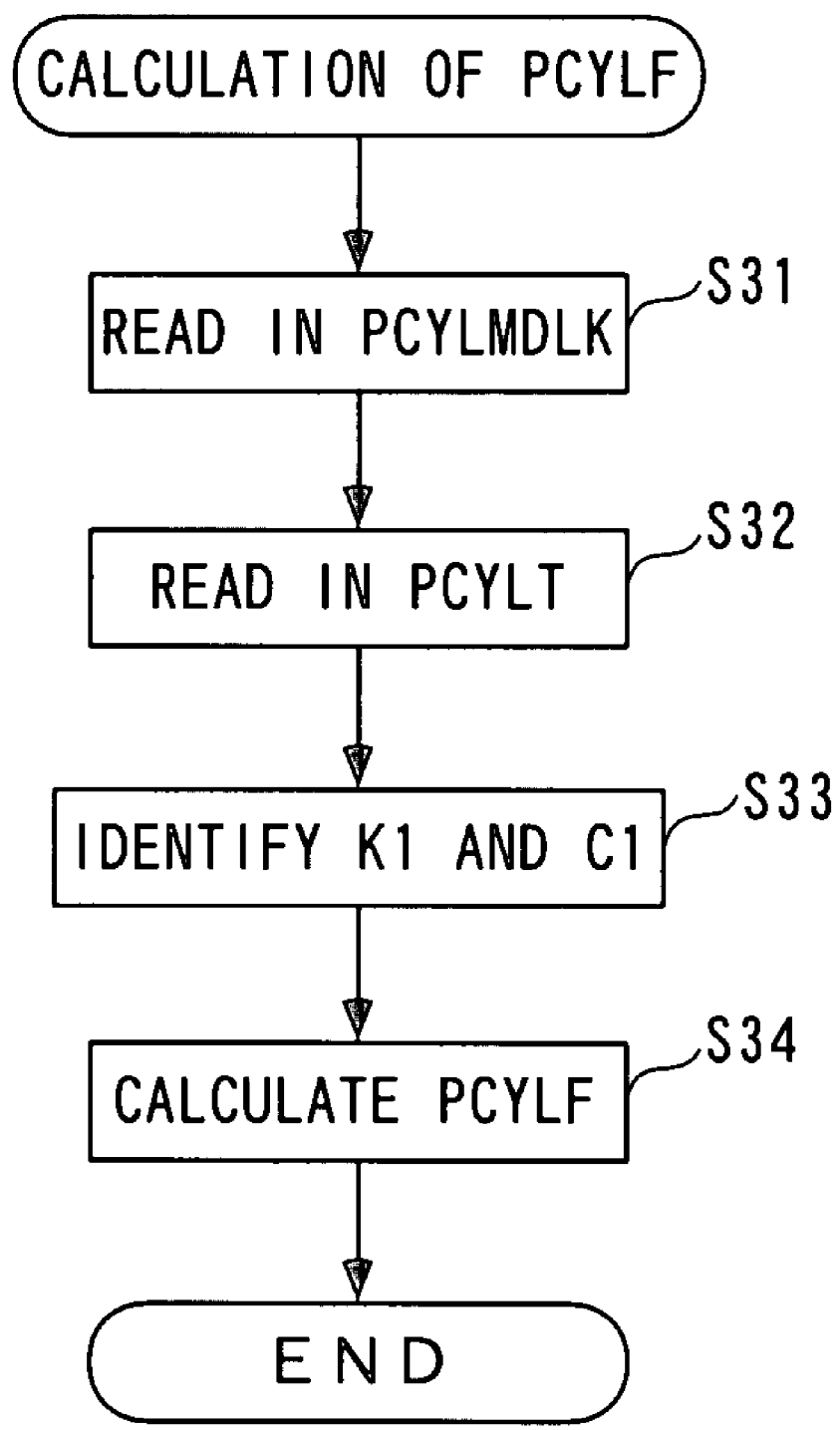
FIG. 7 is a flowchart showing a process (subroutine) for calculating an in-cylinder pressure.

FIG. 7 shows a process for calculating the in-cylinder pressure PCYLF, which is executed as a subroutine in the step 2 in FIG. 2. First, in a step 31, out of a large number of motoring pressure values PCYLMDLK(i) calculated in the FIG. 4 process, motoring pressure values PCYLMDLK(i) obtained in the aforementioned identification section I (see FIG. 2) during the compression stroke are read in. Then, a large number of the detected in-cylinder pressure values PCYLT(i) detected in the same identification section I are read in (step 32).

Next, the correction parameters K1 and C1 are identified using the motoring pressure values PCYLMDLK(i) and the detected in-cylinder pressure values PCYLT(i), which have been read in the step 32 (step 33). As described hereinabove, the correction parameters K1 and C1 are identified by the least-squares method such that the square of the value of the difference (PCYLMDLK(i)−(PCYLT(i)×K1+C1)) between the motoring pressure PCYLMDLK(i) and the in-cylinder pressure PCYLF(i) obtained by correcting the detected in-cylinder pressure PCYLT(i) by the aforementioned equation (1) using the values of K1 and C1 obtained thus far, becomes minimum.

Then, the new correction parameters K1 and C1 identified as above are applied to the equation (1), to correct the detected in-cylinder pressure values PCYLT(i) in all the crank angle sections, whereby the final in-cylinder pressure PCYLF(i) is calculated (step 34), followed by terminating the present process.

As described hereinbefore, in the present embodiment, when the motoring pressure PCYLMDLK is estimated in the FIG. 4 process, the correction coefficient K0 and the correction term C0, which are correction parameters for correcting the motoring pressure PCYLMDLK, are corrected using the atmospheric pressure-dependent correction coefficient KPAMDLKK and the atmospheric pressure-dependent correction term KPAMDLKC such that the correction coefficient K0 and the correction term C0 become smaller as the atmospheric pressure PA is lower. Therefore, it is possible to estimate the motoring pressure PCYLMDLK properly while causing changes in the atmospheric pressure PA to be reflected thereon. This makes it possible to properly identify the correction parameters K1 and C1 based on the motoring pressure PCYLMDLK and the detected in-cylinder pressure PCYLT, and correct the detected in-cylinder pressure PCYLT by the identified correction parameters K1 and C1, whereby the final in-cylinder pressure PCYLF can be accurately calculated without being adversely affected by changes in the atmospheric pressure PA.

Figure 8:
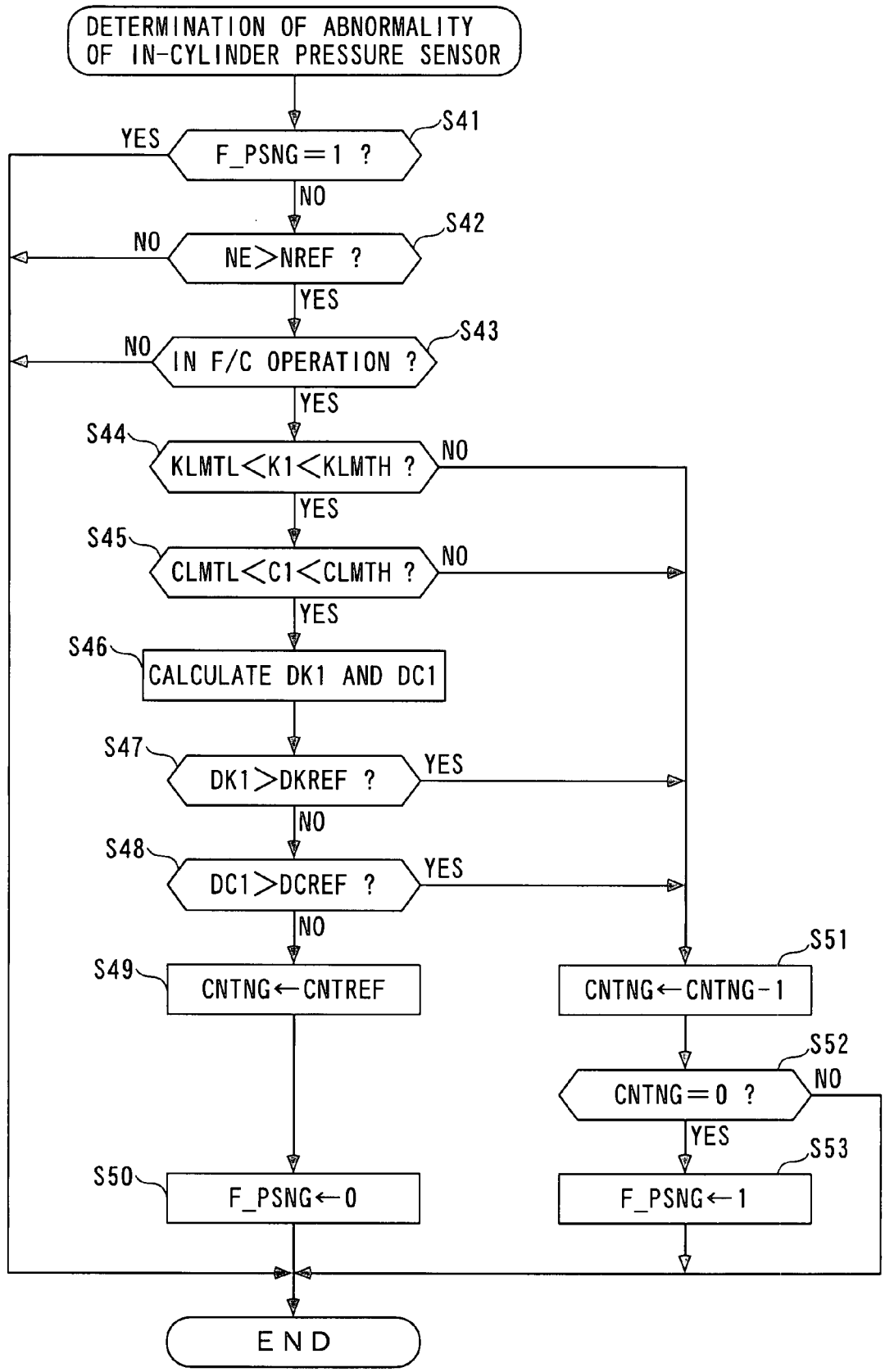
FIG. 8 is a flowchart showing a process for determining abnormality of an in-cylinder pressure sensor.

FIG. 8 shows a process for determining abnormality of the in-cylinder pressure sensor 11 based on the correction parameters K1 and C1.

This determination is based on the following concept: The correction parameters K1 and C1 are applied to the equation (1) and identified, as mentioned above, and hence they represent the degree of agreement between the motoring pressure PCYLMDLK and the detected in-cylinder pressure PCYLT. More specifically, when the detected in-cylinder pressure PCYLT agrees with the motoring pressure PCYLMDLK, the correction coefficient K1 is calculated as a value approximately equal to 1.0, and the correction term C1 as a value approximately equal to 0. On the other hand, when the detected in-cylinder pressure PCYLT is different from the motoring pressure PCYLMDLK, the difference between the correction coefficient K1 and the above value thereof and/or the difference between the correction term C0 and the above value thereof become(s) larger as the difference between the detected in-cylinder pressure PCYLT and the motoring pressure PCYLMDLK is larger. Therefore, it is possible to determine the abnormality of the in-cylinder pressure sensor 11 based on the correction parameters K1 and C1.

The FIG. 8 process is carried out in synchronism with generation of each TDC signal pulse. In the present process, first, in a step 41, it is determined whether or not a sensor abnormality flag F_PSNG is equal to 1. If the answer to this question is affirmative (YES), i.e. if it has already been determined that the in-cylinder pressure sensor 11 is abnormal, the present process is immediately terminated.

If the answer to the question of the step 41 is negative (NO), it is determined whether or not the engine speed NE is larger than a predetermined engine speed NREF (e.g. 500 rpm) (step 42). If the answer to this question is negative (NO), the present process is immediately terminated, whereas if the answer is affirmative (YES), i.e. if NE>NREF holds, it is determined whether or not the engine 3 is in F/C operation (step 43). If the answer to the question of the step 43 is negative (NO), i.e. if combustion is being performed within the cylinder 3a, to eliminate adverse influence of combustion pressure on the determination, the determination is not performed, but the present process is immediately terminated.

On the other hand, if the answer to the question of the step 43 is affirmative (YES), i.e. if the engine 3 is in F/C operation, it is determined whether or not the correction coefficient K1 is within a predetermined range defined by a lower limit value KLMTL (e.g. 0.5) and an upper limit value KLMTH (e.g. 2.0) (step 44), and it is determined whether or not the correction term C1 is within a predetermined range defined by a lower limit value CLMTL (e.g. −0.3) and an upper limit value CLMTH (e.g. 0.3) (step 45).

If the answer to the question of the step 44 is negative (NO), i.e. if the correction coefficient K1 is not within the above-mentioned predetermined range, it is judged that there is a possibility that an abnormality e.g. of a gain has occurred in the in-cylinder pressure sensor 11, and the process proceeds to a step 51, referred to hereinafter. Further, if the answer to the question of the step 45 is negative (NO), i.e. if the correction term C1 is not within the above-described predetermined range, it is judged that there is a possibility that an abnormality, such as a drift, has occurred in the in-cylinder pressure sensor 11, and similarly the process proceeds to the step 51.

If both of the answers to the questions of the steps 44 and 45 are affirmative (YES), i.e. if the correction coefficient K1 and the correction term C1 are within the respective predetermined ranges, the deviation DK1 of the correction coefficient K1 and the deviation DC1 of the correction term C1 are calculated by the respective following equations (step 46):

$$DK1=|K1-K1AVE| \quad (4)$$

$$DC1=|C1-C1AVE| \quad (5)$$

wherein K1AVE and C1AVE represent respective average values of values K1 and C1 including the current K1 and C1 values, which have been obtained by executing the identification a predetermined number of times (16 times).

Then, it is determined whether or not the calculated difference DK1 is larger than a predetermined threshold value DKREF (e.g. 1.0) (step 47), while it is determined whether or not the deviation DC1 is larger than a predetermined threshold value DCREF (e.g. 0.2) (step 48).

If the answer to the question of the step 47 is affirmative (YES), i.e. if DK1>DKREF holds, it is judged that there is a possibility that an abnormality, such as a sudden change in the gain of the in-cylinder pressure sensor 11, has occurred, and the process proceeds to the step 51. Further, if the answer to the question of the step 48 is affirmative (YES), i.e. if DC1>DCREF holds, it is judged that there is a possibility that an abnormality, such as a sudden change concerning the drift of the in-cylinder pressure sensor 11, has occurred, and similarly the process proceeds to the step 51.

If both of the answers to the questions of the steps 47 and 48 are negative (NO), it is judged that the in-cylinder pressure sensor 11 is normal, and the count CNTNG of an abnormality determination counter is reset to a predetermined value CNTREF (e.g. 2) (step 49), and the sensor abnormality flag F_PSNG is to 0 (step 50), followed by terminating the present process.

On the other hand, as described above, if the answer to the question of the step 44 or 45 is negative (NO), or if the answer to the question of the step 47 or 48 is affirmative (YES), i.e. if the correction coefficient K1, the correction term C1, or the deviation thereof DK1 or DC1 are out of the associated predetermined range, the count CNTNG of the abnormality determination counter is decremented in the step 51. Then, it is determined whether or not the count CNTNG has become equal to 0 (step 52). If the answer to this question is negative (NO), the present process is immediately terminated.

On the other hand, if the answer to the question of the step 52 is affirmative (YES), i.e. if a state in which the correction coefficient K1, the correction term C1, or the deviation DK1 or DC1 is out of the associated predetermined range has continuously occurred a predetermined number of times, which is equal to a predetermined value CNTREF, it is finally determined that an abnormality has occurred in the in-cylinder pressure sensor 11, and the sensor abnormality flag F_PSNG is to 1 (step 53), followed by terminating the present process.

As described hereinabove, according to the determination process, abnormality of the in-cylinder pressure sensor 11 is determined based on the correction parameters K1 and C1 identified such that the difference between the detected in-cylinder pressure PCYLT and the motoring pressure PCYLMDLK becomes minimum, the deviation DK1 of the correction parameter K1 from the average value thereof, and the deviation DC1 of the correction parameter C1 from the average value thereof. As described above, the correction parameters K1 and C1 are properly identified based on the atmospheric pressure PA. Therefore, it is possible to perform the determination of abnormality of the in-cylinder pressure sensor 11 more accurately while eliminating adverse influence of the atmospheric pressure PA.

It should be noted that the present invention is by no means limited to the above-described embodiment, but it can be practiced in various forms. For example, although in the above-described embodiment, to correct the motoring pressure according to the atmospheric pressure, both the correction coefficient K0 and the correction term C0, which are correction parameters for correcting the motoring pressure, are corrected, this is not limitative, but only one of the correction coefficient K0 and the correction term C0 may be corrected, or alternatively the motoring pressure may be directly corrected according to the atmospheric pressure without using the parameters, i.e. the correction coefficient K0 and the correction term C0.

Further, although in the FIG. 8 process, abnormality of the in-cylinder pressure sensor 11 is determined based on the correction parameters K1 and C1, another proper determination or estimation may be performed in place of or along with the determination. For example, the output characteristics of the in-cylinder pressure sensor 11 vary with the temperature thereof, and therefore temperature in the vicinity of a portion of the cylinder 3a where the in-cylinder pressure sensor 11 is disposed may be estimated based on the correction parameters K1 and C1.

Alternatively, proper determination, estimation, or detection, e.g. determination of a misfire, may be performed based on the relationship between the in-cylinder pressure PCYLF and the motoring pressure PCYLMDLK, without directly using the correction parameters K1 and C1. In such a case as well, the determination or the like can be properly carried out since the motoring pressure PCYLMDLK and the in-cylinder pressure PCYLF can be accurately calculated without being adversely affected by the atmospheric pressure.

Although in the above-described embodiment, the present invention is applied to the automotive gasoline engine by way of example, this is not limitative, but it can be applied to various types of engines, such as diesel engines and engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An in-cylinder pressure detection device for an internal combustion engine, comprising:
   an in-cylinder pressure sensor for detecting pressure within a cylinder of the engine as a detected in-cylinder pressure;
   motoring pressure-estimating means for estimating pressure generated in the cylinder during a non-combustion period as a motoring pressure;
   atmospheric pressure-detecting means for detecting an atmospheric pressure;
   motoring pressure-correcting means for correcting the estimated motoring pressure according to the detected atmospheric pressure;
   correction parameter-identifying means for identifying correction parameters such that a difference between the detected in-cylinder pressure detected during a compression stroke of the engine and the corrected motoring pressure becomes minimum; and
   in-cylinder pressure-correcting means for correcting the detected in-cylinder pressure by the identified correction parameters, to thereby calculate an in-cylinder pressure.

2. An in-cylinder pressure detection device as claimed in claim 1, further comprising crank angle-detecting means for detecting a crank angle of the engine, and
   wherein said motoring pressure-estimating means calculates the motoring pressure by an arithmetic expression including a volume of the cylinder which is calculated based on the detected crank angle.

3. An in-cylinder pressure detection device as claimed in claim 1, wherein said motoring pressure-correcting means corrects the motoring pressure such that as the atmospheric pressure is lower, the motoring pressure becomes lower.

4. An in-cylinder pressure detection device as claimed in claim 1, further comprising determination means for performing predetermined determination including determination of abnormality of said in-cylinder pressure sensor based on the correction parameters.

5. A method of detecting in-cylinder pressure of an internal combustion engine, comprising:
   an in-cylinder pressure-detecting step of detecting pressure within a cylinder of the engine as a detected in-cylinder pressure;
   a motoring pressure-estimating step of estimating pressure generated in the cylinder during a non-combustion period as a motoring pressure;
   an atmospheric pressure-detecting step of detecting an atmospheric pressure;
   a motoring pressure-correcting step of correcting the estimated motoring pressure according to the detected atmospheric pressure;
   a correction parameter-identifying step of identifying correction parameters such that a difference between the detected in-cylinder pressure detected during a compression stroke of the engine and the corrected motoring pressure becomes minimum; and
   an in-cylinder pressure-correcting step of correcting the detected in-cylinder pressure by the identified correction parameters, to thereby calculate an in-cylinder pressure.

6. A method as claimed in claim 5, further comprising a crank angle-detecting step of detecting a crank angle of the engine, and
   wherein said motoring pressure-estimating step includes calculating the motoring pressure by an arithmetic expression including a volume of the cylinder which is calculated based on the detected crank angle.

7. A method as claimed in claim 5, wherein said motoring pressure-correcting step includes correcting the motoring pressure such that as the atmospheric pressure is lower, the motoring pressure becomes lower.

8. A method as claimed in claim 5, further comprising a determination step of performing predetermined determination including determination of abnormality of an in-cylinder pressure sensor that detects the in-cylinder pressure, based on the correction parameters.

9. An engine control unit including a control program for causing a computer to execute a method of detecting in-cylinder pressure of an internal combustion engine, wherein the control program causes the computer to detect pressure within a cylinder of the engine as a detected in-cylinder pressure, estimate pressure generated in the cylinder during a non-combustion period as a motoring pressure, detect an atmospheric pressure, correct the estimated motoring pressure according to the detected atmospheric pressure, identify correction parameters such that a difference between the detected in-cylinder pressure detected during a compression stroke of the engine and the corrected motoring pressure becomes minimum, and correct the detected in-cylinder pressure by the identified correction parameters, to thereby calculate an in-cylinder pressure.

10. An engine control unit as claimed in claim 9, wherein the control program further causes the computer to detect a crank angle of the engine, and wherein when the control program causes the computer to estimate the motoring pressure, the control program causes the computer to calculate the motoring pressure by an arithmetic expression including a volume of the cylinder which is calculated based on the detected crank angle.

11. An engine control unit as claimed in claim 9, wherein the control program causes the computer to correct the motoring pressure, the control program causes the computer to correct the motoring pressure such that as the atmospheric pressure is lower, the motoring pressure becomes lower.

12. An engine control unit as claimed in claim 9, wherein the control program further causes the computer to perform predetermined determination including determination of abnormality of an in-cylinder pressure sensor that detects the in-cylinder pressure, based on the correction parameters.

* * * * *